April 7, 1942.　　　J. H. ODENBACH　　　2,279,091
SHIP CONSTRUCTION
Filed March 25, 1939　　　5 Sheets-Sheet 2
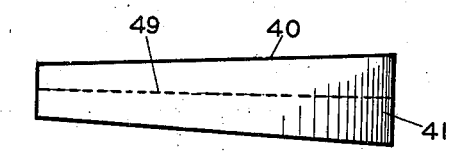
FIG. 7
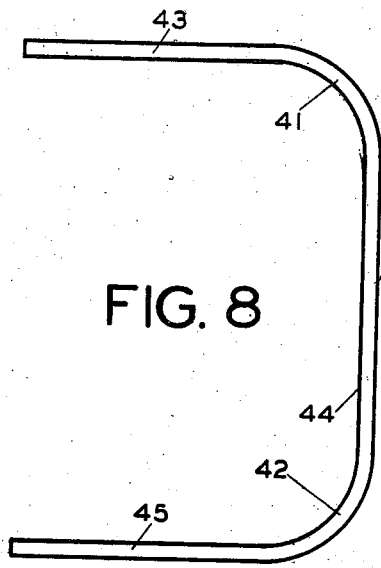
FIG. 8
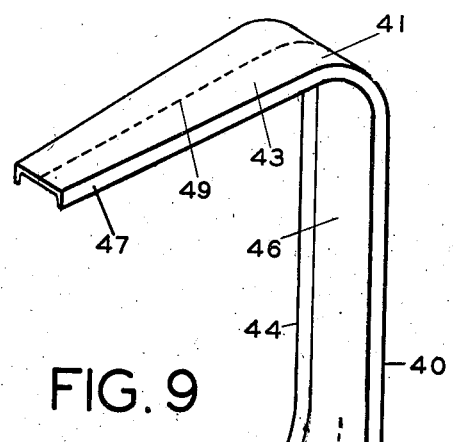
FIG. 9
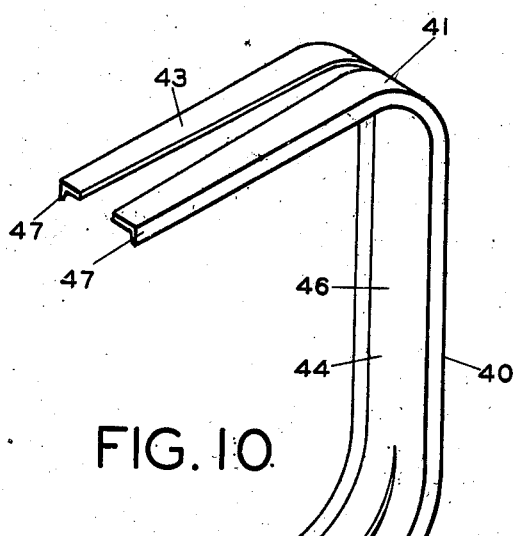
FIG. 10
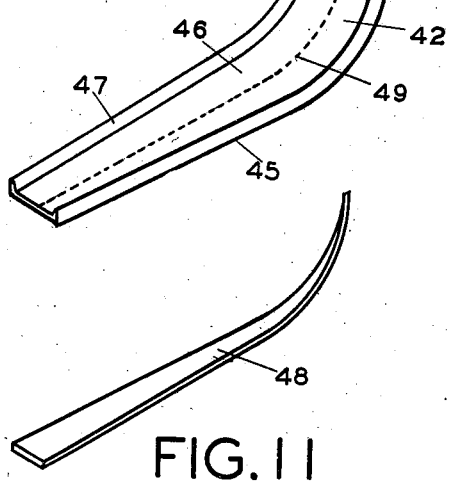
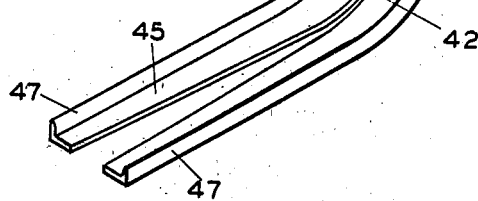
FIG. 11
INVENTOR
JOHN H. ODENBACH
BY Mathias R. Kendolf
ATTORNEY

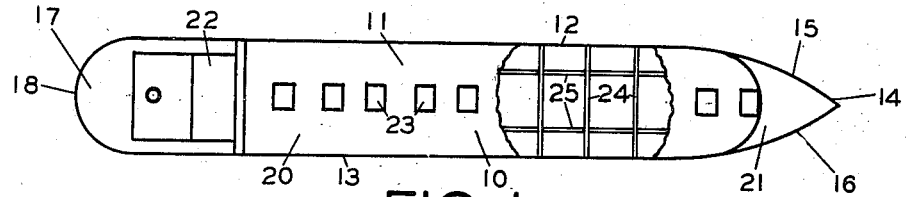

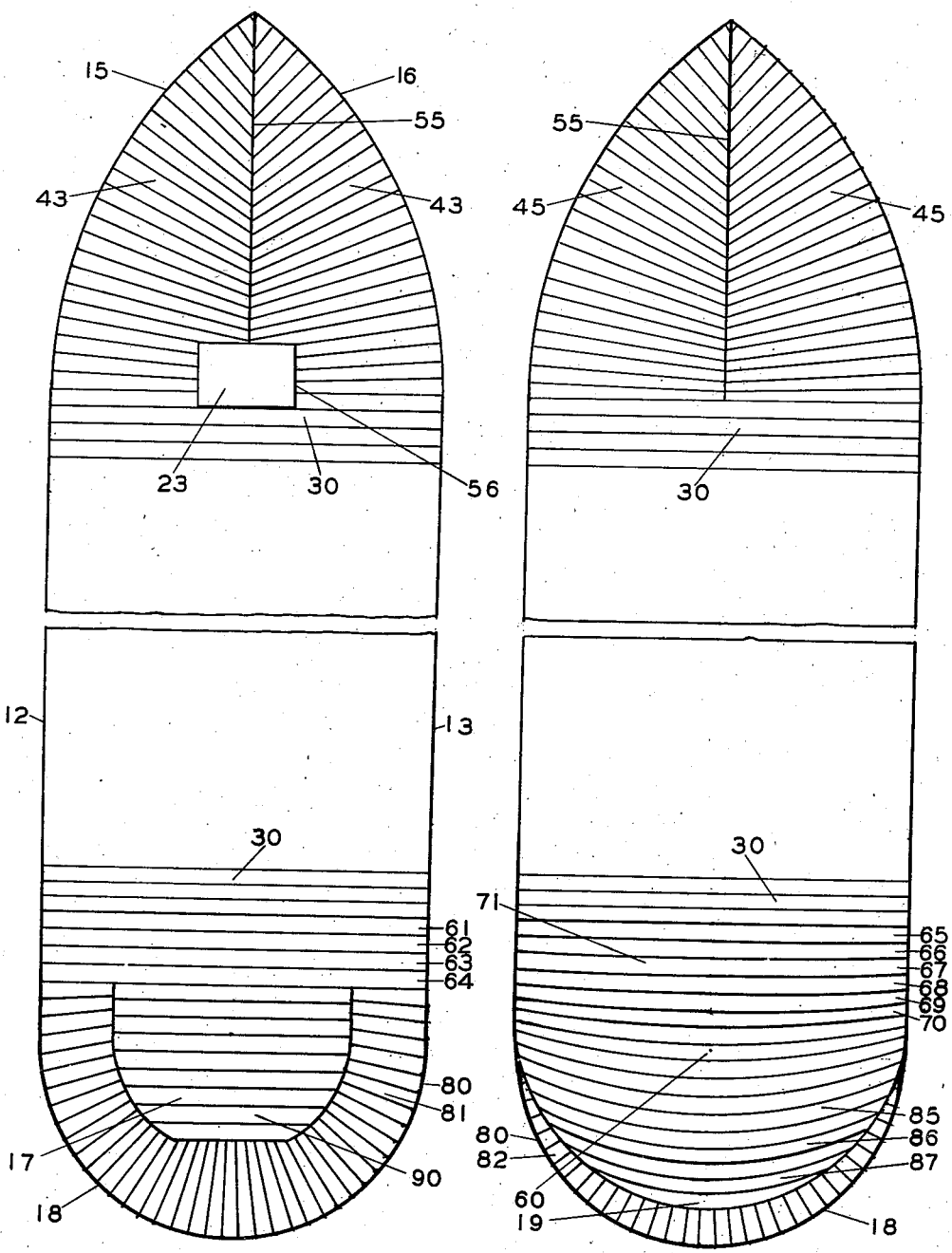

April 7, 1942.  J. H. ODENBACH  2,279,091
SHIP CONSTRUCTION
Filed March 25, 1939  5 Sheets-Sheet 4

INVENTOR
JOHN H. ODENBACH
BY Matthias R. Kondolf
ATTORNEY

April 7, 1942.  J. H. ODENBACH  2,279,091
SHIP CONSTRUCTION
Filed March 25, 1939  5 Sheets-Sheet 5

INVENTOR
JOHN H. ODENBACH
BY Mathias R. Kondolf
ATTORNEY

Patented Apr. 7, 1942

2,279,091

UNITED STATES PATENT OFFICE 2,279,091

SHIP CONSTRUCTION

John H. Odenbach, Rochester, N. Y., assignor to Odenbach Holding Corporation, Rochester, N. Y., a corporation of New York Application March 25, 1939, Serial No. 264,090

15 Claims. (Cl. 114—79)

This invention relates to an improved method of ship construction and to the product of such a method.

In the prior patents, Nos. 2,018,865 of Oct. 29, 1935 and 2,104,053 of Jan. 4, 1938, I have described methods of constructing the hull of a ship which are particularly adapted for use in building the straight or center portion of the hull having parallel sides.

This application is particularly directed to methods utilized in the construction of the bow and stern portions of the hull wherein the sides of the hull are curvilinear and converging.

In the customary construction of ships the bottom and sides are spoken of as the shell or outside plates and are, with the decks, kept to the proper shape by means of frames running across the ship. These are called transverse frames or ribs and beams where they run under the deck.

The transverse frames are upheld in their proper relative positions by other frames which run lengthwise in the ship, one, if at the center line, being called the center keel, and others fitted at the sides, known as keelsons and side stringers. All the fore and aft frames, taken together, are spoken of as the longitudinal frame of the ship.

Besides the transverse and longitudinal frames there are partitions, used to divide the internal spaces of the ships, which are called bulkheads. Transverse frames are ordinarily 24 to 36 inches apart in cargo ships. At the extreme ends of the ships the outer section or shell plates on the two sides is attached to forgings which are known as the stem at the fore end and the stern post at the after end of the longitudinal frame.

The longitudinal framing is carried right forward and aft when possible, and the ends of the several frames are connected together across the ship by strong plates and angles, which are called knees. Additional supports, introduced to enable the vessel to withstand the heavy blows of the sea in bad weather, are called panting stringers, panting knees, and panting beams, panting being the term applied to the movements which occur in the side plating if sufficient strength is not provided.

At the stern a transverse frame, called a transom, is attached to the upper part of the stern post to form a base for cant frames of the overhanging part of the stern which is known as the counter. To assist the beams and bulkheads in holding the decks to their proper positions, vertical pillars are introduced in large numbers; but to avoid the loss of space and inconvenience in handling cargo, ordinary pillars are often dispensed with, and special pillars, and deep deck girders are fitted instead.

In the customary construction, the various plates and frames are connected together by means of rivets. The diameter of the rivet varies in accordance with the thickness of the plate to be connected, being generally about ¼ inch more than the thickness of the plates. The distance from center to center of the rivets is spoken of as the pitch, and is generally expressed in diameters. For connecting plates and bars in the frames, the pitch of the rivets runs generally up to 7 diameters; and in securing edges which must be water or oil tight, and in butts and edges of shell plates the pitch varies from 3 to 5 diameters.

The usual method of working the shell plating is by alternate inside and outside strakes of plating, the outside plates overlapping the inside plates, and the space between them and the frames being filled in by slips or liners. In working the overlap butts, the plates on each side must have the edges lapped over the ends of the lap butt, and in order that they may be brought close, some machining is necessary, which is called scarfing, i. e. cutting away the corners of the projecting butt so as to produce smooth surfaces for the inside laps. In many cases the plates and sometimes the frames are joggled, (offset) so that flat lying joints may be obtained, and the use of liners avoided.

In forming the bow and stern portions of the ship hull with plates in the customary manner, the plates must be formed to the proper curves by suitable bending machines, the rivet holes must be accurately laid out and punched or drilled, the edges of the plates must be scarfed or joggled and, after riveting in place, the joints must be caulked.

In order to make each separate plate of the bow and stern sections to correct curvature and dimensions it is often necessary to design and make up moulds, the backs of which are straight lines which lie in one plane when the moulds are in their proper position. A variation from this practice involves the individual fitting of each plate to the frames which serve to support the plates. Plates curved in two directions, such as are often used in the bow and stern sections are generally furnaced to secure the proper curvature.

In the usual practice of shipbuilding the frame of the hull is erected piece by piece on the ways and then the plating is riveted to the frame. To check the spread of the transverse frames during their erection, shoring is used, and often ribbands are also used.

In the description and drawings which follow it will be noted that the improved method of hull construction disclosed eliminates many of the special frames, ribs, beams, stringers, knees and pillars as well as vast quantities of rivets and many of the customary and costly steps involved in the usual ship construction.

The outer shell corresponding to the usual plating is constructed of channel members with flanges abutting. The toes of the channels are turned inwardly and the adjacent flanges are welded. By reason of its great strength this shell provides to a great extent for the framing of the ship as well. Additional strength is provided by plate bulkheads of the full cross section size of the hull which extend transversely approximately 36 feet apart.

Fore and aft bulkheads extend from forward engine room bulkhead to the bulkhead aft of the dry cargo space well up in the ship's bow. Large brackets extend both fore and aft from the ends of the longitudinal bulkheads and stringers and keelsons carry the strength fore and aft. The fore and aft bulkheads, extending through the entire amidships portion of the ship give great rigidity to the hull.

Deep frames approximately 12 feet apart are provided and longitudinals extend within the hull on the fore and aft bulkheads and in back of the rubbing plates welded to the outside of the hull. An inner or double bottom is provided and rubbing plates are welded to the bottom of the hull. All joints throughout the hull are welded so that the entire structure is integral.

For the amidships or straight portion of the ship the channel members extend completely around the hull. The bow of the hull is formed with U-shaped members having the flat central portion extending vertically in the sides and the legs forming the bottom and top of the hull. The rounded stern portion of the ship is formed with shaped members in the fantail and with transverse curved members in the counter and run.

In general, the operations of curving the channel members, placing the members in a jig to secure alignment of unitary sections, tack welding the members while in the jig to preserve alignment, permanently welding the joints between the members and combining the sections to form the complete hull, follows the method shown in Patent No. 2,104,053. Special operations will be described more fully hereinafter.

The principal object of this invention is to provide an economical, rapid and strong construction for ship hulls.

An important object of the invention is to provide a method of working standard structural shapes so that they are adapted for use in forming the curved surfaces of the hull as well as the straight sides of the hull.

A further object of the invention is to provide a method of construction which minimizes the necessity of exact design and layout for the ship members and plates.

A further object of the invention is to provide a method of hull construction which can be practiced with a minimum of shipyard equipment.

A further object of the invention is to provide a hull having a smooth and easily cleansed interior surface.

A further object of the invention is to provide a method which can be applied to construct unitary sections of the curved portions of the hull, which sections are then combined with others in a graving dock to form the complete hull.

A further object of the invention is to provide a hull construction which is adapted to line production, and enables the sections of the hull to pass through the several operations as units, until they are combined in the finished product.

A further object of the invention is to provide a method of construction which practically eliminates the necessity of furnacing plates or structural members.

To these and other ends the characteristic features and advantages of my improvements will more fully appear in the following descriptions and in the accompanying drawings in illustration thereof.

In the drawings in which like reference numerals designate like parts

Fig. 1 is a plan view of a ship with deck partly cut away.

Fig. 2 is a side elevation of the ship shown in Fig. 1.

Fig. 3 is a plan view of a standard channel member used in practicing the invention.

Fig. 4 is a transverse section through two adjacent channel members showing the welding of the flanges.

Fig. 5 is a continuous length of the channel shown in Fig. 3 bent to the cross section shape of the ship which is shown as rectangular in shape with rounded corners.

Fig. 6 is a perspective front view of the hull of the ship.

Fig. 7 is a plan view of a bow channel member.

Fig. 8 is an elevation of the member shown in Fig. 7.

Fig. 9 is a perspective view of the member shown in Figs. 7 and 8.

Fig. 10 is a perspective view of the member shown in Fig. 7, in the course of working to obtain the member shown in Fig. 9.

Fig. 11 is a perspective view of the sectoral piece cut from each end of the member shown in Fig. 10.

Fig. 12 is a plan view of the top of the hull showing the deck members used in the bow and stern construction.

Fig. 13 is a plan view of the bottom of the hull of Fig. 12 showing the members used in the bow and stern construction.

Figure 14:
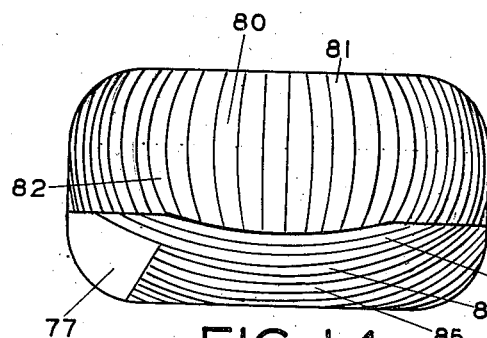
Fig. 14 is an end view of the stern of the hull shown in Fig. 12.

Referring to Fig. 1, reference numeral 10 designates the hull of a ship constructed in accordance with the invention herein disclosed. The hull 10 comprises an amidships or center portion 11 which has parallel sides 12 and 13. The bow or front end of the hull 14 is formed with converging sides 15 and 16 and the stern or rear end 17 has, in plan view, a generally rounded fantail 18 and an inclined bottom or counter 19 in elevation, as shown in Fig. 2. The top of the hull forms the main deck 20.

Mounted on the bow is the forecastle 21 and also mounted on the hull is the superstructure 22 comprising cabins, pilot house, bridge, etc. A number of hatches as shown at 23, provide entry through the deck 20 to the interior of the hull. The transverse bulkheads 24 and the fore and aft bulkheads 25 are shown through the cut away portion of the deck 20.

In Fig. 1 the forecastle 21 and the superstructure 22 are each constructed as separate units from the hull proper. If desired, these units may be detachably mounted on the hull and thus adapt the ship for canal and river navigation, where limited vertical clearance prevails.

In Fig. 5 is shown a channel or member 30 bent to rectangular shape with rounded corners and conforming to the cross sectional shape of the hull in its amidship portion. The ends of the channel are joined and the member thus forms a hoop-like section of the ship as long as the channel is wide. The formed member 30 comprises a flat bottom 31, a top 32 and sides 33 and 34. The curved corners connect the bottom and sides and top and sides of the formed member 30.

After the member has been formed to the hoop-like shape shown in Fig. 5 the ends are welded together as shown at 36. After a number of the hoop-like members are assembled, aligned and tack welded in the jig, the unitary section thus formed will be self-supporting and will require little, if any, bracing to maintain its shape.

After removal from the jig, the members comprising the unitary section formed by the assembled and tack welded members 30 are permanently welded together at the heel and toe of each adjacent flange, as shown at 37 and 38 in Fig. 4.

Referring to Figs. 1, 6 and 12 it will be noted that the bow portion 14 of the hull 10 has converging sides 15 and 16 and one of the principal objects of this invention is to provide a novel method for the construction of the curved sides of the bow.

It will be noted that when a series of curved and tapered channel members (such as shown in Fig. 9)—each member having a central portion with parallel flanges and tapered end portions or legs joined to the central portion by a curve of ninety degrees total deflection—are assembled with the flanges of the channels in contact, the section thus formed will have a sectoral shape in the plane of the tapered legs and the webs in the parallel central portions will lie in a curved cylindrical surface standing at ninety degrees to the plane of the tapered legs. Radii from this curved surface will match with the sides of the tapered legs. The bow construction conforms to this concept.

From this concept it will be obvious that if the parallel central portions of the members are assembled to form the side of a section of a hull and the tapered legs form the deck and bottom of the hull section, the sides of the hull section will be curved and the deck and bottom will be flat.

As shown in Figs. 7, 8, 9, 10 and 11 a structural channel member 40 is first curved or bent at two points 41 and 42 and then comprises the upper leg 43, the center portion or intermediate tangent 44 and the bottom leg 45. The channel member 40 is formed with a web 46 and flanges 47 as shown in cross section in Fig. 4.

From the web in each leg of the U-shaped member shown in Fig. 10, sectoral pieces 48 are cut. The cuts extend from each end of the member, down each leg and around each curved portion and end at the beginning of the intermediate tangent between the curves. After the pieces 48 are removed from the web the flanges of the channel are forced inwardly to bring the cut edges of the web into contact and the web is welded along the joints 49 as shown by the broken lines in Figs. 7 and 9.

The cut made in the web is of a width to cause the flanges of the finished member to converge along lines which match radial lines to the curve in the sides of the bow.

Figs. 12 and 13 show how the tapered members are combined in the hull to form the curved sides of the bow as well as the top and bottom of the bow structure.

The tapered legs 43 and 45 of the U-shaped members as shown in Fig. 9 form the top and bottom of the hull while the straight portion of these members form the sides of the hull.

It will be noted that the ends of the members are cut off at the proper slant where they meet at the median vertical plane 55 of the hull, or where they join the coaming 56 around the hatch openings 23.

The amidships portion of the hull has parallel sides and is formed with the hoop-like members 30 shown in Fig. 5. As shown in Fig. 12 similar members completely encircling the hull may be used in the construction until the stern portion of the hull is reached.

Referring to Figs. 1, 2, 12, 13 and 14 it will be noted that the stern portion of the hull 10 has a rounded fantail 18 as well as an inclined run 60 leading up to the counter 19 and one of the principal objects of this invention is to provide a novel method for the construction of the curved and inclined stern of the hull.

It will be understood that the method of working the structural members disclosed herein is adapted to form a variety of curvilinear and angular shapes which may be used in various combinations to construct the stern or other portions of the hull.

The design of the stern will vary to meet specific conditions. One shape of stern is shown in Figs. 12 to 17 inclusive but it will be obvious that variations in the shape may be obtained within the scope of this invention. In the construction shown, the members forming the bottom of the stern section are carried completely across the hull and the skeg or deadwood 59 is welded to these members, suitable floors and other internal bracing being provided in the hull to secure adequate strength.

Figure 15:
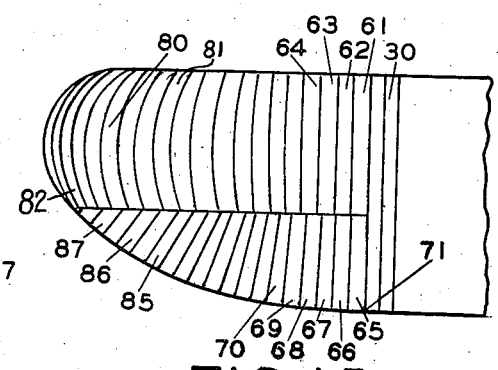
Fig. 15 is a side view of the stern of the hull shown in Fig. 12.

Referring to Figs. 12 and 15, the hoop-like members 30, such as shown in Fig. 5, are carried back to the end of the parallel sides portion of the hull. The top of the hull above the beginning of the run 60 and extending back to the curved stern portion 17 is formed by U-shaped channels, such as shown at 61, 62, 63 and 64, extending across the top of the hull and down each side. The legs of these channels are not tapered. The lower ends of these upper channels 61 to 64 inclusive butt against the upper ends of the lower channels, such as shown at 65, 66, 67 and 68 (shown in Figs. 13 and 15). These upper and lower channels completely encircle and form the shell of the hull between the straight amidships portion and the beginning of the stern fantail.

Referring to Fig. 13 it will be noted that the channels 65, 66, 67 and 68 and adjacent lower channels 69 and 70 extend across the bottom of the hull and have tapered legs extending up the sides of the hull. The converging flanges of the tapered legs of these channels cause the bottom of the hull to move upwardly at 71 and thus form the beginning of the run 60 which extends to the counter 19.

Figure 16:
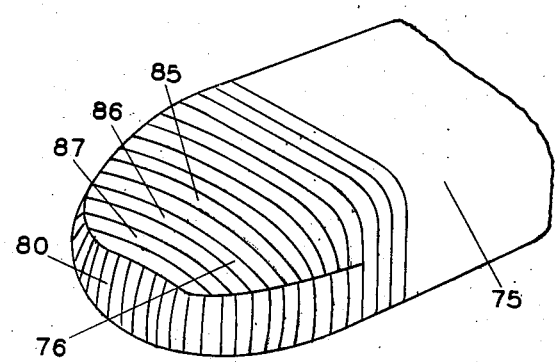
Fig. 16 is a perspective view of the bottom of the stern of the hull of Fig. 12 during construction.
Figure 17:
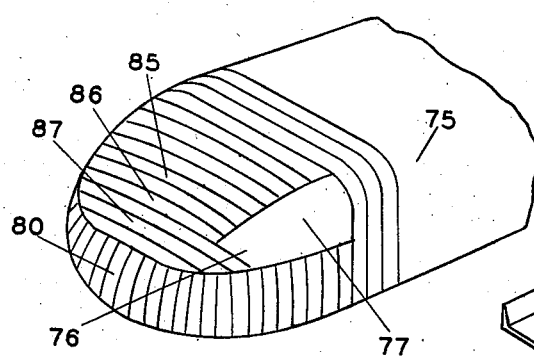
Fig. 17 is a perspective view of the bottom of the stern of the hull of Fig. 12 showing a variation in which plating is used in a portion of the bottom.

In order to secure good lines in the ship it is desirable that the radius of the turn of the bilge as at 75 (see Figs. 16 and 17) which is uniform for the length of the amidships portion of the hull be gradually flattened to merge into the lower curve of the counter under the stern of the ship as at 76. As shown in Figs. 16 and 17 it will be noted that this section of the bottom of the hull, shown as a clear space 77 in Fig. 17, is curved both transversely and longitudinally of the hull and the curvature changes throughout the length of the section 77. Such a surface may be described as an "ellipsoidal" surface.

In order to secure a curved surface such as that shown in the space 77 it is necessary that the curve in adjacent members be varied, and to secure a smooth exterior surface this requires the radius of the web at one flange of the channel be different from the radius of the web at the other side or flange of the same channel. This result may be obtained in bending the channels as described in Pat. No. 1,970,182 using in the bending machine therein described a tapered eccentric 17 and a forming block 6 with an angular face matching the taper in the eccentric.

Figure 20:
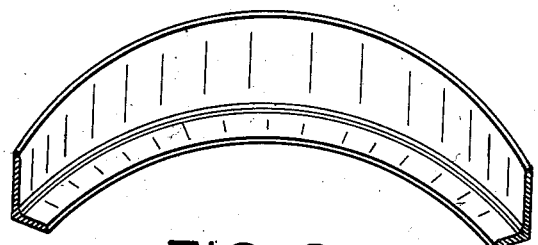
Fig. 20 is a structural member adapted for use in forming a curved section of the hull.
Figure 21:
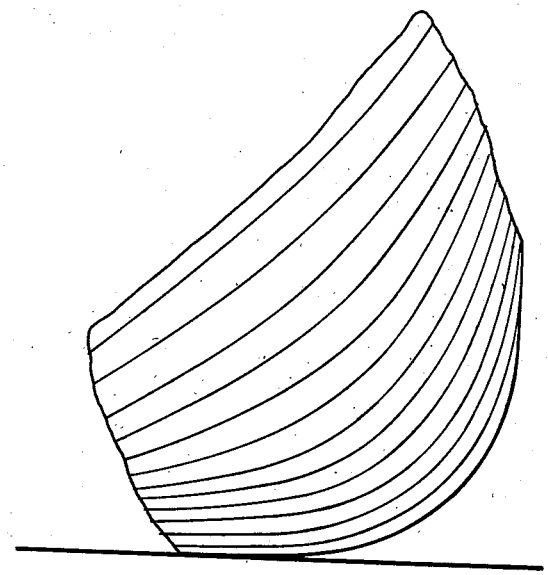
Fig. 21 is a curved section of a hull formed by a plurality of the members shown in Fig. 20.

If the variation in the required radius of each edge of the member be large it may be preferable to remove one flange of the channel (thus forming an angle member) and cut the web to fit the next adjacent member. In Fig. 20 is shown a channel member with one flange removed and the web cut as described. In Fig. 21 is shown a hull section of changing curve (similar to section 77 in Fig. 17) formed with a series of members like that shown in Fig. 20. It will be understood that such a curve section may be separately constructed and assembled with the other members in the hull.

As an alternative it is sometimes preferable to construct the curve section 77 with plating and to accomplish this a number of floors or beams are secured within the hull and plating formed to the proper curve is welded to this support.

Figure 18:
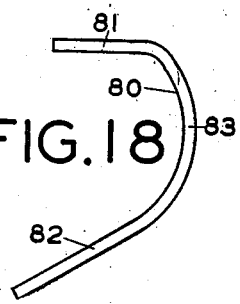
Fig. 18 is a side view of a shaped channel member used in the stern of the hull.

The extreme curve portion of the stern 17 or fantail 18 may be constructed with curved channel members such as shown at 80 in Fig. 18. These members have a tapered top leg 81 and a tapered bottom leg 82 and a center straight portion 83. The tapered legs 81 lie in the plane of the top of the hull while the lower legs 82 form the counter 19 and the upper part of the run 60. The mid portion of the run 60 is formed by transverse channels like 85, 86 and 87 which extend across the bottom and join with the lower ends of the fantail members 80. As shown in Fig. 14 the transverse members like 85, 86 and 87 are curved upwardly at each end and thus join with the members 80 as described.

As shown in Fig. 12 the flat top of the hull between the ends of the members forming the stern fantail is built up of straight channel members of the proper length, such as shown at 90, which are welded to each other and to the ends of the fantail members.

Figure 19:
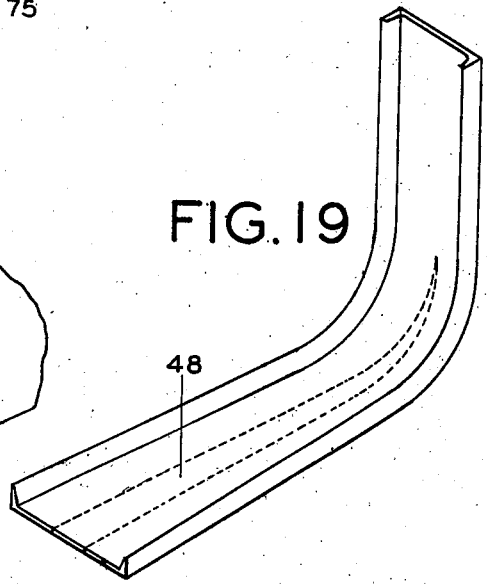
Fig. 19 is a perspective view of a channel member having an additional sectoral piece welded into its web for use in hull construction.

In Fig. 19 is shown a curved channel member in which the web at one end is cut along the center line. The flanges of the member may now be separated and a sectoral piece like 48 as shown in Fig. 11 be inserted in the opening. The contacting edges of the web and piece 48 are welded and a structural member is obtained with a tapered leg, having the flanges converge towards the straight portion of the member. This type of member is adapted for use in constructing a concave or reentrant curve in the hull surface.

I claim:

1. A hull, comprising a center section including a series of adjoining transverse encircling channel members; hatches in the top of said hull; a bow section comprising a plurality of contiguous U-shaped channels, each having tapered legs and an intermediate portion, and positioned with sets of the tapered legs in adjoining relation in the top and bottom of said bow section and the intermediate portions in adjoining relation to form the curved sides of said bow section; a stern section including a plurality of shaped channel members, each having a tapered leg, with the tapered legs positioned in adjoining relation in said stern section; a plurality of transverse bulkhead members, of hull cross-section size; one or more longitudinal bulkhead members of hull depth and welded joints between the adjoining members.

2. A hull, comprising a center section including a series of adjoining transverse encircling channel members; a bow section comprising a plurality of contiguous U-shaped channel members, each having tapered legs and an intermediate portion, and positioned with sets of the tapered legs in adjoining relation in the top and bottom of said bow section and the intermediate portions in adjoining relation in the curved sides of said bow section; a stern section including a plurality of shaped members, each having a tapered leg, with the tapered legs positioned in adjoining relation; a plurality of transverse bulkhead members, of hull cross-section size; one or more longitudinal bulkhead members of hull depth, and welded joints between the adjoining members.

3. A hull, comprising a center section including a series of adjoining transverse encircling channel members; a bow section comprising a plurality of contiguous U-shaped channel members, each having tapered legs and an intermediate portion, positioned with sets of the tapered legs in adjoining relation in the top and bottom of said bow section and the intermediate portions in adjoining relation in the curved sides of said bow section; a stern section including a plurality of shaped members, each having a tapered leg and a curved portion, with the tapered legs positioned in adjoining relation in the top of said stern section and the curved portions of said members in adjoining relation in the curved rear of said stern section, and welded joints between the adjoining members.

4. A hull, comprising a center section including a series of adjoining transverse encircling channel members; a bow section comprising a plurality of contiguous U-shaped channel members, each having tapered legs and an intermediate portion, positioned with sets of the tapered legs in adjoining relation in the top and bottom of said bow section and the intermediate portions of said members in adjoining relation in the curved sides of said bow section and welded joints between the adjoining members.

5. A hull, comprising a center section including a series of adjoining transverse encircling channel members; a stern section including a plurality of shaped channel members, each having a tapered leg and a curved portion, with the tapered legs positioned in adjoining relation in the top of said stern section and the curved portions of said members in adjoining relation in the curved rear of said stern section and welded joints between the adjoining members.

6. A bow section of a hull, comprising a plurality of U-shaped channel members, each having tapered legs and an intermediate portion, with sets of the tapered legs positioned in adjoining relation in the top and bottom of said bow section and the intermediate portions of said members in adjoining relation in the curved sides of said bow section; and welded joints between the adjoining members.

7. A stern section of a hull comprising a plurality of shaped channel members, each having a tapered leg and a curved portion, with the tapered legs positioned in adjoining relation in the top of said section and the curved portions of said members positioned in adjoining relation in the curved rear of said section and welded joints between the adjoining members.

8. A stern section of a hull comprising a plurality of shaped channel members, each having a tapered leg and a curved portion, with the tapered legs positioned in adjoining relation in the top of said section and the curved portions of said members positioned in adjoining relation in the curved rear of said section; transverse channel members extending between the lower ends of said shaped members to form the bottom of said section; and welded joints between all of the adjoining members.

9. The method of constructing a hull section having a curved surface which consists in bending a plurality of normally straight channel members, each having a web and parallel flanges, to form body portions and legs; cutting a sectoral piece of approximately the same length as said leg, from the web of each leg; forcing the cut edges into contact and welding the joint to converge the channel flanges for a length corresponding to the length of the sectoral piece removed; assembling the members with the body portions in adjoining relation and the leg portions in adjoining relation and welding the joints between the adjoining members.

10. A section of a hull comprising a plurality of adjoining members, each member fabricated from a commercial structural channel to provide a straight leg and a tapered leg substantially perpendicular to said straight leg, and having the tapered legs positioned in the plane of a section of a hypothetical cylinder and the straight legs positioned in the curved surface of said hypothetical cylinder; and welded joints between the adjoining members.

11. A section of a hull comprising a plurality of adjoining members, each member fabricated from a commercial structural channel to provide a straight leg and a tapered leg substantially perpendicular to said straight leg and connected thereto by a curved portion; said tapered legs being positioned in the plane of a section of a hypothetical cylinder and the straight legs being positioned in the curved surface of said hypothetical cylinder; and welded joints between the adjoining members.

12. A section of a hull comprising a series of adjoining commercial structural channel members, each channel member having a web and side flanges and each member being fabricated to provide a straight leg and a tapered leg joined by a connecting curve, a portion of the web of each individual member being curved longitudinally to different radii at its opposite edges; and with the members so arranged in the section to place the curved webs approximately in an ellipsoidal surface and welded joints between the adjoining members.

13. A structural member for shipbuilding comprising a commercial structural channel relatively narrow in proportion to length and fabricated to provide a curved web between oppositely disposed flanges, said web being curved longitudinally to different radii at its opposite edges.

14. A section of a hull comprising a series of adjoining commercial structural channel members, each channel member having a web and side flanges and each member being bent to provide two legs joined by a connecting longitudinal curve of different radii at each opposite side flange; and with the members so arranged in the section to place the curved webs approximately in an ellipsoidal surface and welded joints between the members.

15. A section of a hull comprising a series of adjoining commercial structural members, each having a web and a side flange; said members being each fabricated and bent to provide two legs joined by a connecting longitudinal curve of different radii at each side of said web; said web being cut to varying width for the length of said connecting curve; and with the members so arranged in the section to place the curved webs approximately in an ellipsoidal surface and welded joints between the members.

JOHN H. ODENBACH.